(12) United States Patent
Hayden et al.

(10) Patent No.: US 6,865,318 B1
(45) Date of Patent: Mar. 8, 2005

(54) ATHERMAL OPTICAL COMPONENTS

(75) Inventors: Joseph Hayden, Clarks Summit, PA (US); Samuel David Conzone, Clarks Summit, PA (US); Alexander J. Marker, III, Springbrook Turnpike, PA (US)

(73) Assignee: Schott Glass Technologies, Inc., Duryea, PA (US)

( * ) Notice: Subject to any disclaimer, the term of this patent is extended or adjusted under 35 U.S.C. 154(b) by 0 days.

(21) Appl. No.: 09/536,460

(22) Filed: Mar. 28, 2000

Related U.S. Application Data

(63) Continuation-in-part of application No. 09/511,783, filed on Feb. 23, 2000, now abandoned.

(51) Int. Cl.[7] .............................. G02B 6/26; C03C 3/16
(52) U.S. Cl. ......................... 385/31; 385/37; 385/123; 501/45; 501/48; 252/301.4 P
(58) Field of Search ............................ 385/24, 31, 37, 385/123, 124; 501/43–48, 73–78; 359/241, 244, 565, 569, 578, 589, 115, 124, 127, 131; 398/82–88; 252/301.4 P, 301.6 P

(56) References Cited

U.S. PATENT DOCUMENTS

| | | | |
|---|---|---|---|
| 4,022,707 A | 5/1977 | Deutschbein et al. | |
| 4,190,451 A | * 2/1980 | Hares et al. | ................. 501/13 |
| 4,333,848 A | 6/1982 | Myers et al. | |
| 4,525,842 A | 6/1985 | Myers | |
| 4,713,820 A | 12/1987 | Morris et al. | |
| 4,770,811 A | 9/1988 | Myers | |
| 4,929,387 A | 5/1990 | Hayden et al. | |
| 4,962,067 A | 10/1990 | Myers | |
| 5,032,315 A | 7/1991 | Hayden | |
| 5,260,828 A | 11/1993 | Londono et al. | |
| 5,278,107 A | 1/1994 | Tick et al. | |
| 5,322,820 A | 6/1994 | Myers | |
| 5,334,559 A | 8/1994 | Hayden | |
| 5,364,819 A | * 11/1994 | Dexter et al. | ................. 501/45 |
| 5,504,628 A | 4/1996 | Borchard | |
| 5,526,369 A | 6/1996 | Hayden et al. | |
| 5,651,022 A | 7/1997 | Anthon et al. | |
| 5,663,972 A | 9/1997 | Payne et al. | |
| 5,721,802 A | 2/1998 | Francis et al. | |
| 5,737,120 A | 4/1998 | Ariola | |
| 5,745,289 A | 4/1998 | Hamblen | |
| 5,909,308 A | 6/1999 | Ulrich | |
| 5,920,663 A | 7/1999 | Dragone | |
| 5,991,089 A | 11/1999 | Kreitzer | |
| 6,008,941 A | 12/1999 | Feldman et al. | |
| 6,652,972 B1 | * 11/2003 | Conzone et al. | ............ 428/426 |
| 2002/0192422 A1 | * 12/2002 | Conzone et al. | ........... 428/64.1 |

* cited by examiner

*Primary Examiner*—Hemang Sanghavi
(74) *Attorney, Agent, or Firm*—Millen, White, Zelano & Branigan, P.C.

(57) ABSTRACT

Athermal optical components comprise cubic crystalline materials including silver chloride and cesium bromide, or comprise composites of at least two layers of different compositions wherein the total optical pathlength, nL, across said layers is essentially independent of temperature.

11 Claims, 1 Drawing Sheet

ATHERMAL OPTICAL COMPONENTS

Figure 1:
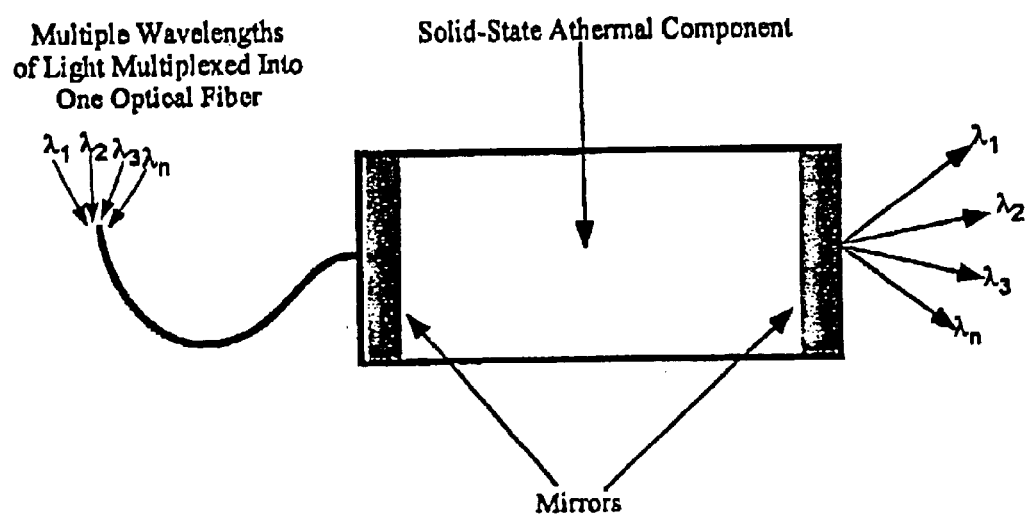

This application is a continuation in part of U.S. Ser. No. 09/511,783 filed on Feb. 23, 2000, now abandoned, whose entire disclosure is incorporated by reference herein.

FIELD OF THE INVENTION

The present invention relates to athermal optical devices, materials enabling achievement of athermal behavior in them and corresponding methods. Athermal optical devices according to the present invention are particularly suitable, e.g., for use in applications where heat is generated or ambient temperature changes, e.g., in photonic or laser applications, where the temperature can range, e.g., from approximately −10 to approximately 70° C. Such devices are especially useful, e.g., in the telecommunications industry. Athermal behavior is particularly necessary for these and other devices to operate in a stable manner (without distortion) as the temperature fluctuates. By definition, the optical pathlength (OPL, product of refractive index (n) and length (L)) through an athermal device remains essentially constant or constant with temperature fluctuations (i.e., $\Delta OPL=0$).

BACKGROUND OF THE INVENTION

Various materials are known for use in the telecommunications and optical industry for the fabrication of lasers, waveguides, modulators and various other components which otherwise manipulate light. Attempts have been made to arrive at solid-state athermal devices, but such attempts have only been varyingly successful. While a plethora of available glasses have some athermal characteristics, traditional glasses will not sufficiently satisfy the requirements of this invention.

Glasses termed "athermal" are commonly used in Fabry-Perot interferometers. These interferometers are often used in high-resolution spectrometers, and as the optical resonator component of a laser. See, e.g. Bass, M. *Handbook of Optics: Fundamentals, Techniques, and Design*, McGraw-Hill, Inc., New York (1995); Saleh, B. E. A., and Teich, M. C., *Fundamentals of Photonics*, John Wiley and Sons, Inc., New York (1991). The governing equation (from Bach, H. and Neuroth, N., *The properties of Optical Glass*, Springer, Germany (1995)) for an "athermal glass" intended for use in a Fabry-Perot Interferometer is:

$$\Delta OPL = L \cdot \Delta T(dn/dT + \alpha \cdot (n-1)) \qquad (1)$$

wherein $\Delta OPL$ is the change in optical pathlength, L is the length of the glass component, $\Delta T$ is the change in temperature, $dn/dT$ is the temperature coefficient of the refractive index, $\alpha$ is the coefficient of thermal expansion, and n is the refractive index of the glass.

Furthermore, the Fabry Perot interferometer should exhibit $\Delta OPL=0$ with temperature fluctuation, and the resulting material property requirements for the "athermal glass" (from Bach, infra) are:

$$dn/dT = \alpha(n-1)) \qquad (2)$$

Schott Glass Technologies, Duryea, Pa. has developed glasses specifically for this purpose (i.e., Ultran-30™, PSK-54™ and TiF-6™ in Table I; see, e.g. *Schott Optical Glass Catalog*). These glasses are termed "athermal" because when used in the classic Fabry Perot device, the device itself exhibits athermal behavior. However, the glass per se is not a solid-state athermal component because air gaps are machined or mechanically engineered into the glass to yield the device's overall athermal properties. However, telecommunications companies are currently developing devices that require purely solid-state athermal components (e.g., no air or vacuum is displaced as the material expands or contracts because the optical component is used completely in the solid-state; see FIG. 1.

Thus, there is currently a need for specialty materials and devices that exhibit solid-state athermal behavior, e.g., in the telecommunications industry.

SUMMARY OF THE INVENTION

Various materials (both monolithic and hybrid) which yield solid-state athermal behavior are useful in the present invention. Such materials are suitable for use by the telecommunications and other industries for applications such as (but not limited to) dense wavelength division multiplexing and demultiplexing.

The solid-state athermal materials and devices according to the present invention satisfy the following thermal characteristic:

$$nL(T+\Delta T)=(n(T)+(dn/dT \cdot \Delta T))(L(T)+(L(T) \cdot \alpha \cdot \Delta T)=nL(T) \qquad (3)$$

i.e., nL is independent of T.

The present invention provides crystalline, polymeric and/or hybrid (e.g., including glass/polymer, glass/crystal, and crystalpolymer composites) materials to satisfy the need for solid-state athermal devices. The following condition must be met, for a material to yield solid-state athermal behavior (i.e., to satisfy Equation (1)).

$$dn/dT = -n \cdot \alpha \qquad (4)$$

Thus, the temperature coefficient of the refractive index (dn/dT) must have essentially the same magnitude as the product of the refractive index (n) and the coefficient of thermal expansion ($\alpha$), but with the opposite sign.

In various aspects, this invention relates to:

an athermal optical element comprising a silver chloride or cesium bromide surface having a surface figure of <200 nm:

an athermal optical element comprising a surface of a crystalline, cubic material with a surface figure of <200 nm, said material having an index of refraction, n, and a coefficient of expansion, $\alpha$, such that:

$$dn/dT = -n\alpha;$$

in an optical demultiplexer useful for dispersing radiation of multiple wavelengths in the range of about 1300–1700 nm, e.g., 1300–1500 nm comprising an optical window which transmits such radiation and/or an etalon which disperses such radiation, the improvement wherein said window and/or etalon is athermal and comprises silver chloride or cesium bromide;

in a laser cavity comprising at least one optical window, the improvement wherein said optical window is an athermal optical element of this invention;

an optical system comprising an optical fiber or an optical waveguide optically coupled to a demultiplexer of this invention;

in an optical demultiplexer useful for dispersing radiation of multiple wavelengths in the range of about 1300–1700 nm, e.g., 1300–1500 nm comprising an optical window which transmits such radiation and/or an etalon which disperses such radiation, the improvement wherein said window and/or etalon comprises a cubic crystalline material which is optically athermal, said material having an index of refraction, n, and a coefficient of expansion, α, such that:

$$dn/dT = -n\alpha;$$

an athermal, optical composite material comprising at least two layers of different compositions wherein the total optical pathlength, nL, across said layers is essentially independent of temperature;

in an optical demultiplexer useful for dispersing radiation of multiple wavelengths in the range of about 1300–1700 nm, e.g., 1300–1500 nm comprising an optical window which transmits such radiation and/or an etalon which disperses such radiation, the improvement wherein said window and/or etalon comprises a composite material of this invention;

a device for telecommunications applications comprising a window and/or an etalon which (a) is athermal, (b) is transmitting radiation of multiple wavelengths in the range of about 1300–1700 nm, e.g., 1300–1550 nm in which are digitally encoded information data in a demultiplexible format, and (c) is optically coupled to an optical fiber or optical waveguide also transmitting radiation in said wavelength range, wherein said window and/or etalon comprises (a) AgCl, CsBr or other cubic, crystalline material having an index of refraction, n, and a coefficient of expansion, α, such that:

$$dn/dT = -n\alpha$$

or (b) a composite material of this invention;

an athermal cubic crystalline material in which is being transmitted radiation of multiple wavelengths in the range of about 1300–1700 nm, e.g., 1300–1550 nm in which are digitally encoded information data in a demultiplexible format;

a method of athermally transmitting, reflecting, refracting and/or demultiplexing, radiation of multiple wavelengths in the range of 1300–1700 nm, e.g., 1300–1550 nm in which are digitally encoded information data in a demultiplexible format, comprising infringing said radiation on and/or through an optical component comprising (a) AgCl, CsBr, or other athermal cubic crystalline material, or (b) an athermal, optical composite material comprising at least two layers of different compositions wherein the total optical pathlength, nL, across said layers is essentially independent of temperature.

One suitable material which satisfies this requirement is crystalline AgCl. Crystalline AgCl has a $dn/dT = -61 \times 10^{-6}$ $K^{-1}$, $n=2$ and $CTE = 30 \times 10^{-6}$ $K^{-1}$ (see Table I). Hybrid materials, e.g. a glass/polymer, glass/crystal, crystal/polymer, or similar composites suitably selected will also exhibit solid-state athermal behavior. For instance, a glass substrate, with a positive dn/dT and a polymer with a negative dn/dT, appropriately bonded, will result in an acceptable composite for use in a solid-state athermal device. In one embodiment the glass and polymer can be joined, e.g., with a U/V curing epoxy to form the hybrid (composite) material. Such a material will be free of air or vacuum gaps machined or mechanically incorporated into the material and hence be truly "solid state."

FIG. 1 is a side view of one solid-state athermal device according to an embodiment of the present invention. The material of the device has mirrors on both ends and is athermal in the solid state.

The solid-state athermal materials (also referred to hereinafter as a solid-state component) of this invention must have an optical pathlength (n·L) that is essentially independent of temperature fluctuations, typically throughout the range of –10 to 70° C. For example, such materials desirably have values of $(\Delta nL/(nL \cdot \Delta T))$ less than about $1 \times 10^{-4}$ $K^{-1}$, preferably less than about $1 \times 10^{-5}$ or $1 \times 10^{-6}$ $K^{-1}$, most preferably less than about $1 \times 10^{-7}$ $K^{-1}$ or, of course, even lower.

Such materials are useful in telecommunications and other optical devices, e.g., for demultiplexing the multitude of distinct wavelengths that propagate through an optical fiber within a dense wavelength division multiplexed optical network, or analogous waveguide systems, laser systems, etc. or wherever athermal optical behavior is desired.

Since OPL=n·L, when the temperature of a solid-state optical component fluctuates, the optical path length can be affected by changes in length (due to thermal expansion/contraction) and/or refractive index (due to the temperature coefficient of refractive index). As mentioned above, athermal behavior will be achieved (to a first order approximation) when $$dn/dT = -n\alpha, \text{ or } (dn/dT)/(n \cdot \alpha) = -1 \quad (5)$$

Table I lists certain properties for several crystalline, polymeric and glass materials, along with their corresponding values of $((dn/dT)/(n \cdot \alpha))$. See *Schott Optical Glass Catalog*, (infra), Tilton, L W. Et al. "Refractive Index of Silver Chloride for Visible and Infra-Red Radiant Energy", J. Optical Soc. Am., [40] 8, p.540 (1950); Klocek, P. *Handbook of Infrared Optical Materials*, Marcel Dekker, Inc., New York (1991); and Weber, M. J. *Handbook of Laser Science and Technology*, CRC Press, Florida (986). Values at or near 1.5 μm are relevant because this wavelength is commonly used in telecommunications applications. Similarly relevant are data in the approximate temperature range of –10 to 70° C. since most telecommunication devices operate at about room temperature, nominally.

TABLE I

PROPERTIES OF SELECTED MATERIALS

| | Crystal System | dn/dT ($K^{-1}$) | Comments | n | Comments | α ($K^{-1}$) | Comments | (dn/dT)/(nα) |
|---|---|---|---|---|---|---|---|---|
| Crystal | | | | | | | | |
| AgCl | Cubic | –6.1E–05 | 610 nm | 2.01 | 1.5 μm | 3.0E–05 | 20 to 60 C. | 1.01 |
| CsBr | Cubic | –8.4E–05 | 1.15 μm | 1.67 | 2 μm, 27 C. | 4.7E–05 | 0 C. | 1.07 |
| BaF2 | Cubic | –1.7E–05 | near IR | 1.47 | 1.5 μm | 1.8E–05 | 0 to 200 C. | 0.63 |

TABLE I-continued

PROPERTIES OF SELECTED MATERIALS

| | Crystal System | dn/dT (K⁻¹) | Comments | n | Comments | α (K⁻¹) | Comments | (dn/dT)/(nα) |
|---|---|---|---|---|---|---|---|---|
| CaF2 | Cubic | −6.0E−06 | near IR | 1.43 | 1.5 μm | 1.9E−05 | 27 C. | 0.22 |
| LiF | Cubic | −1.2E−05 | Approximation | 1.60 | 0.125 μm | 3.7E−05 | 0–100 C. | 0.20 |
| KBr | Cubic | −4.0E−05 | 0.700 μm | 1.54 | 1.5 μm | 3.9E−05 | 0 C. | 0.67 |
| KCl | Cubic | −3.3E−05 | 0.589 μm | 1.78 | 0.2 μm | 3.7E−05 | 0 C. | 0.49 |
| Tl(Br, I) (KRS-5) | Cubic | −2.5E−04 | 0.577 μm | 2.62 | 0.577 μm | 5.8E−05 | 20 to 100 C. | 1.67 |
| RbBr | Cubic | −4.5E−05 | 1.15 μm | 1.53 | 1.55 μm | 3.7E−05 | 0 C. | 0.79 |
| RbCl | Cubic | −3.9E−05 | 1.15 μm | 1.48 | 1.55 μm | 3.6E−05 | 27 C. | 0.73 |
| RbI | Cubic | −5.6E−05 | 1.15 μm | 1.62 | 1.55 μm | 3.9E−05 | 20 C. | 0.89 |
| Polymer | | | | | | | | |
| Poly-Methyl Methacrylate | N/A | −1.3E−02 | | 1.49 | 0.651 μm | 6.48E−05 | | 129.46 |
| Polystyrene | N/A | −1.2E−02 | | 1.58 | 0.651 μm | 6.30E−05 | | 120.25 |
| Polycarbonate | N/A | −1.4E−02 | | 1.58 | 0.651 μm | 6.84E−05 | | 132.66 |
| Methyl Methacrylate Styrene | N/A | −1.4E−02 | | 1.56 | 0.651 μm | 6.48E−05 | | 138.67 |
| Glass | | | | | | | | |
| Ultran-30 | N/A | −6.5E−06 | 1.06 μm, 20 to 40 C. | 1.54 | 1.529 μm | 1.19E−05 | −30 to 70 C. | 0.36 |
| PSK-54 | N/A | −7.0E−06 | 1.06 μm, 20 to 40 C. | 1.57 | 1.529 μm | 1.19E−05 | −30 to 70 C. | 0.37 |
| TIF-6 | N/A | −6.4E−06 | 1.06 μm, 20 to 40 C. | 1.59 | 1.529 μm | 1.39E−05 | −30 to 70 C. | 0.29 |
| BK-7 | N/A | 2.4E−06 | 1.06 μm, 20 to 40 C. | 1.50 | 1.529 μm | 7.10E−06 | −30 to 70 C. | 0.23 |

Note:
"Comments," if any, are associated with the data column directly to the left. The dn/dT and n values are wavelength dependent.

As may be seen from Table I, AgCl and CsBr are especially suitable materials for use in the solid-state athermal devices of this invention. Both AgCl and CsBr have a ((dn/dT)/(nα)) value that is within 10% of the requirement (i.e.(dn/dT)/(nα)=−1) for a solid-state, athermal optical component. This invention includes all materials satisfying the latter relationship to a degree satisfactory for the desired end use application, e.g., ±10% or even greater where tolerable, but preferably <10%, or <5%, etc. Further by way of example, the value of (ΔnL/nL·ΔT) for AgCl is about 6×10⁻⁷ K⁻¹ (for a 30°Δ T around room temperature).

By way of comparative example, it should be noted that commercially available glasses termed "athermal" i.e., some available from Schott Glass Technologies (of Duryea, Pa.), are not sufficiently athermal and cannot typically be used as the sole optical component in a solid-state athermal device. See the values for Ultran-30, PSK-54 and TiF-6 in Table I. By way of additional comparative example, common polymeric materials (e.g., polymethylmethacrylate (PMMA), polystyrene, polycarbonate and polymethylmethacrylate/styrene) also do not come close to meeting the requirement in Equation (3), as shown in Table I.

Particularly preferred in the present invention are single crystal AgCl or CsBr materials for use in the solid-state athermal devices.

In another embodiment of the invention, a hybrid (or composite) material may be used to satisfy the requirement in Equation (5). It may, for example, be composed of a glass (e.g., with a positive dn/dT) appropriately joined to a polymer (e.g., with a negative dn/dT). Furthermore, analogous glass/crystal or crystal/polymer or other composites will also be operable as hybrid athermal materials for use in the solid state athermal devices of this invention.

In such a hybrid (composite) material, the lengths of the glass and polymer sections (e.g., widths of layers of such materials which have been joined together) are tailored to yield ΔOPL=0 over a preselected temperature range, preferably from −10 to 70° C. The corresponding length ratio is shown in Equation (6) for one particular hybrid, i.e., a glass/polymer composite:

$$\frac{L_{glass}}{L_{poly}} = -\left(\frac{(n_{poly} \cdot \alpha_{poly}) + \frac{dn_{poly}}{dT}}{(n_{glass} \cdot \alpha_{glass}) + \frac{dn_{glass}}{dT}}\right) \quad (6)$$

For example, using the standard material properties for BK-7 glass and PMMA (See Table I), the $L_{glass}/L_{poly}$ ratio must be ≈950 to yield a hybrid, solid-state, athermal optical component of this invention. Analogous relationships as that shown in Equation (4) may be used to determine the thicknesses of glass, crystal, or polymer paths in a glass/crystal or crystal/polymer hybrid material for use in this invention. Of course, the hybrids of this invention are not limited to only binary combinations. Ternary, quaternary etc. combinations (layers, laminations, etc.) are analogously employable as long as overall the nL of the combinations is essentially independent of temperature variations per this invention.

For example, a thin film of polymer (e.g., PMMA or other polymer) is laminated, deposited or otherwise coated onto a selected glass (e.g., BK-7 or other appropriately selected glass) to yield an athermal optical component. Ideally, the optimal glass/polymer combination contains a glass and a polymer with nearly identical indices of refraction and dispersion, with the closest match of CTE possible.

Crystalline materials useful in this invention have a relatively high refractive index (e.g., AgCl, with n≈2). Most of the transparent components in an optical network, however, are composed of $SiO_2$-based glass. These glasses typically have a refractive index of =1.5. In order to minimize possible high insertion loss due to the difference in refraction indices, highly conventional index adjusting, AR (antireflective) and or graded index surface layers can be employed to lower such losses to acceptable levels where desired.

Furthermore, crystalline materials can have undesirable anisotropic optical properties if they are not cubic. Thus, cubic materials are preferred. Accordingly, in a particularly preferred embodiment of the present invention, a cubic crystalline material, e.g., AgCl or CsBr, is utilized, especially to avoid problems due to anisotropic crystalline behavior. An even more preferred embodiment comprises a single crystal solid-state athermal component to avoid substantial optical loss due to light scattering at grain boundaries.

To avoid excessive loss and/or refraction at the interfaces found in the hybrid materials of this invention, the refractive index and dispersion of the e.g., glass and polymer are closely matched. In a preferred embodiment, the difference in the coefficient of thermal expansion of the glass and polymer is also minimized such that large residual stresses are not formed during temperature fluctuations. Finally, it is particularly preferred that the glass and polymer be transparent at the wavelengths of interest, e.g., at telecommunications wavelengths (typically, but not limited to, e.g., 1300–1700 nm, e.g., 1300 to 1550 nm). Examples of preferred glass/polymer, glass/crystal, and crystal/polymer hybrid materials are described below.

Other preferred characteristics for the crystaline or hybrid materials of this invention are derived from end use requirements. For example, in one preferred use of this invention, e.g., in an etalon or other dispersion or demultiplexing solid state athermal device, (comprising, e.g., a typically planar (but also possibly curvilinear) window-type configuration having two surfaces, typically mirrored), it will be important for the flatness of the optical surfaces interacting with radiation of wavelength, $\lambda$, to have, e.g., a surface figure better (less) than about 200 nm, i.e., flatness measured from maximum peak to minimum valley or, e.g., to have a surface figure less than about $\frac{1}{3}\lambda$ (where $\lambda$ is approximately 630 nm). Where multiple internal reflections are involved (e.g., etalons), in some applications high surface parallelness will also be important or a desired pitch of such surfaces may be desired. In other applications, e.g., laser windows, optimum parallelness of the surfaces will usually be desired.

In most telecommunications applications of this invention, the radiation will encode digitized data in multiplexed wavelength format which is at an appropriate time demultiplexed and then followed by decoding of individual wavelengths or wavelength bands. The details of the optical configurations of such demultiplexers (e.g., solid state etalons) are known and/or routinely determinable in consideration of conventional end use requirements and optical relationships.

The materials of this invention can be manufactured routinely. Methods for forming crystalline materials (including single crystals) of compounds such as AgCl and CsBr are very well known. Grinding, polishing, joining etc. operations are also conventional. Thus, formation of the corresponding crystalline athermal solid state devices of this invention can be achieved without undue experimentation. Preferably, these materials will be permanently affixed to other substrates by adhesives other than UV cured agents such as epoxies, e.g., to avoid darkening. Similarly conventional will be the joining of glass, crystal, polymer and other components to form the hybrids of this invention. Typical adhesive agents and methods include those discussed in Example 1 below. Requirements of the resultant joints include the maximum transparency achievable with minimal or no refraction, reflection and/or scattering. Conventional material handling and adhering techniques can be used. Especially useful are the processes disclosed in Ser. No. 09/430,885. The thickness/length of the overall optical components will be selected to arrive at an overall thickness/length of the device comparable to those conventional for such devices, all using the guidance herein. Individual lengths (L) for the optical paths in each subcomponent (e.g., layer) of the hybrid materials of this invention are determined in accordance with the index (n) values of each and the guidance herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above, are hereby incorporated by reference.

EXAMPLES

Example 1
Composite Material: Glass to Polymer

The polymer, PMMA, (see properties in Table I), is joined to an optically transparent glass, Schott BK-7 (Available from Schott Glass Technologies, Duyrea, Pa.) (see properties in Table 1), to yield a composite material that has solid state athermal properties.

The polymer layer is typically much thinner (100 to 10000 times thinner) than the glass, due to the requirement set forth by Equation (6). This thin layer of polymer is joined to the glass by any of the following techniques:

1) Sputtering a thin film of PMMA onto the glass;
2) Dip coating the glass in methyl methacrylate monomer, and then curing the monomer to form PMMA using heat and/or UV light;
3) Joining a thin section of PMMA to the glass with a UV curing epoxy and then grinding and polishing away the excess polymer to yield the correct thickness;
4) Joining a thin section of PMMA to the glass with any type of optically transparent adhesive and then grinding and polishing away the excess polymer to yield the correct thickness;
5) Melting and/or evaporating a thin layer of PMMA onto the glass;
6) Using a joining or coating technique common in materials science to form a glass/polymer composite material.

Although a specific example is given above, the glass need not be BK-7 specifically, and the polymer need not be PMMA specifically. Any suitable glass/polymer combination may be used by one of skill in the art having regard for this disclosure, as long as the optical path length of the glass increases with increased temperature, and the optical path length of the polymer decreases with increased temperature.

The thickness of a glass and polymer required to yield an athermal device can be calculated using Equation (6), based on the properties of the respective materials.

Example 2

Composite Material: Crystal to Polymer

Crystals typically have a large thermal expansion coefficient, and their optical path lengths generally increase as the temperature increases (even though a crystal may have a negative dn/dT, see Table I). Thus, a crystal is joined to a polymer (in the same way that a lass was in Example #1) to yield a solid state athermal material. The increase in optical path length of the crystal (with increasing temperature) will be offset by the decreasing optical path length of the polymer (with increasing temperature) to yield a solid state athermal material (when joined together). An equation with the same form as Equation (6) is used to calculate the thickness of the crystal and polymer sections required to yield athermal behavior, simply by using the properties of the appropriate crystal and polymer. A crystal/polymer composite is formed by the same techniques described in Example 1, i.e. by sputtering, dip coating, epoxy joining, evaporation, coating the polymer onto the crystal, etc.).

Example 3

Composite Material: Glass to Crystal

The optical path length of some crystals, such as KRS-5, decreases with increasing temperature. A glass, such as BK-7 or vitreous silica that has an optical path length that increases with increasing temperature, is joined to such a crystal to yield solid state athermal behavior. The thickness of the glass and crystal segments is calculated using an equation with the same form as Equation (6), where the properties of the appropriate glass and crystalline material are used. Such a glass/crystal composite will be prepared by:

1) Heat fusion (diffusion) bonding, assuming the mismatch in coefficient of thermal expansion is not so large that the joint fails during cooling;
2) Spin coating a sol-gel onto a glass (that is later heat treated to form a thin film of crystalline material);
3) Spin coating a sol-gel onto a crystal (that is later heat treated to form a thin film of glass);
4) Joining a segment of glass to a segment of crystalline material with a UV curing epoxy;
5) Joining a segment of glass to a segment of crystalline material with an optically transparent adhesive or glue;
6) Sputtering glass onto a crystal, or crystal onto a glass;
7) Growing a single crystal on a glass substrate;
8) Placing the glass and crystal in intimate contact (optical contacting);
9) Using index-matching oil to fill the gap between the crystalline and glassy segments, and then holding those segments in place with a mechanical fixture;
10) Using a silicate-based sol-gel liquid (i.e. sodium silicate solution) to join the glass to the crystal.

Crystals other than KRS-5 and CsBr may be used as long as the optical path length of the crystal decreases with increasing temperature. Furthermore, glasses other than $SiO_2$ and BK-7 could be used as long as the optical path length of the glass increases with increasing temperature.

While the above examples will be carried out in accordance with the steps described therein, it should be noted that any other method of glass to crystal joining that is commonly used in the field of materials science may be used so long as the resultant composite product meets the optical requirements of Equation 4.

Example 4

Single crystal AgCl and single crystal CsBr are cut into windows. The surfaces thereof are polished to high flatness and mirrored. The resultant components are used as etalons to disperse light of wavelengths of 1300–1700 nm, e.g., 1300–1550 into component wavelengths.

The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions. Upon further study of the specification and appended claims, further objects and advantages of this invention will become apparent to those skilled in the art.

We claim:

1. An athermal optical element comprising a surface of a crystalline, cubic material with a surface figure of <200 nm, said material having an index of refraction, n, and a coefficient of expansion, α, such that:

$$dn/dT = -n\alpha,$$

wherein T is temperature.

2. An optical element of claim 1 wherein said surface is sufficiently large to function as a demultiplexer.

3. An optical element of claim 1 wherein said surface is exposable to air.

4. An athermal, optical composite material comprising a number of layers, m, at least two layers having different compositions and different values of dn/dT, wherein the total optical pathlength, nL, across all of said layers m is essentially independent of temperature; the optical parameters of said layers satisfying the equation $$\sum_{i=1}^{m} L_i (dn_i/dT + n_i \alpha_I) = 0$$

where m is the number of layers, $L_i$ is the thickness of the $i^{th}$ layer in the direction of optical use, $n_i$ and $\alpha_i$ are the refractive index and thermal expansion of the material making up the $i^{th}$ layer and dn/dT is the variation of refractive index of the material making up the $i^{th}$ layer with temperature T, and at least two of said values of dn/dT have opposite signs.

5. A composite material of claim 4 wherein each of said layers comprises a glass composition, a crystalline material or a polymeric material.

6. A composite material of claim 4 wherein said layers are glass/crystalline, glass/polymeric or polymeric/crystalline composites.

7. A composite material of claim 6 having a surface with a surface figure of <200 nm.

8. An athermal, optical composite material comprising at least two layers of different compositions, wherein the total optical pathlength, nL, across said two layers is essentially independent of temperature; and wherein n is index of refraction, L is the total thickness of the layers, and T is temperature.

9. A composite material of claim 8 wherein each of said layers comprises a glass composition, a crystalline material or a polymeric material.

10. A composite material of claim 8 wherein said layers are glass/crystalline, glass/polymeric or polymeric/crystalline composites.

11. A composite material of claim 10 having a surface with a surface figure of <200 nm.

* * * * *

UNITED STATES PATENT AND TRADEMARK OFFICE
CERTIFICATE OF CORRECTION

| | | |
|---|---|---|
| PATENT NO. | : 6,865,318 B1 | Page 1 of 1 |
| APPLICATION NO. | : 09/536460 | |
| DATED | : March 8, 2005 | |
| INVENTOR(S) | : Joseph Hayden et al. | |

It is certified that error appears in the above-identified patent and that said Letters Patent is hereby corrected as shown below:

Column 10, line 42, reads "dn/dT" should read -- dni/dT --

Signed and Sealed this

Twentieth Day of November, 2007

JON W. DUDAS
*Director of the United States Patent and Trademark Office*